Oct. 10, 1939.  E. E. MILLER  2,175,441
MUD PUMP PISTON
Filed April 20, 1937
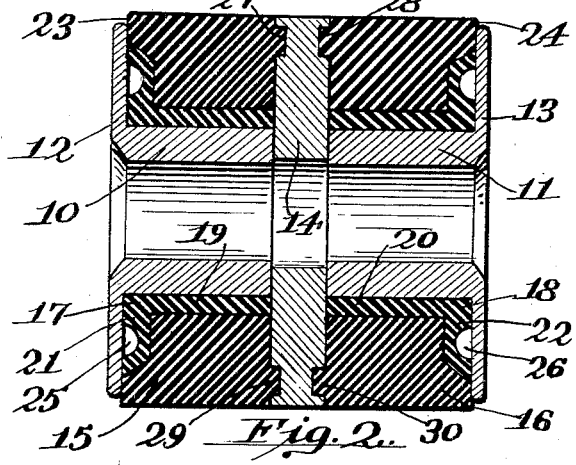
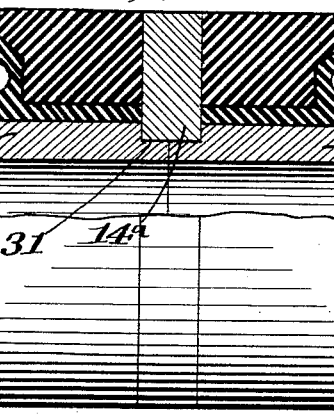
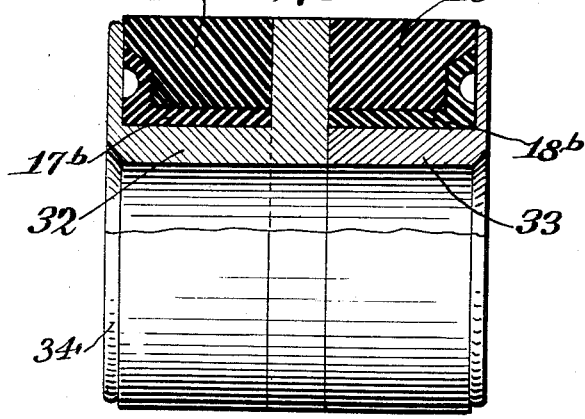
Inventor:
Erwin E. Miller
by Hazard and Miller
Attorneys Patented Oct. 10, 1939

2,175,441

UNITED STATES PATENT OFFICE 2,175,441

MUD PUMP PISTON

Erwin E. Miller, Fullerton, Calif.

Application April 20, 1937, Serial No. 137,983

10 Claims. (Cl. 309—23)

My invention relates to improvements in mud pump pistons or pistons designed for use in pumps subject to like conditions as those of mud pumps.

An object of the invention is to provide an improved mud pump piston which is of simple design and which may be very easily constructed from stock material and which would be very durable in its wear.

In mud pump pistons it has been desirable to provide the piston with rubber rings which engage the cylinder walls. These rubber rings provide at the ends of the piston outwardly flaring lips which engage and seal against the cylinder walls. The center of the piston is usually somewhat relieved or it is so arranged as not to engage cylinder walls with the same pressure as the lips thereby reducing wear and reducing friction of the piston on the cylinder walls.

An object of the present invention is to provide an improved mud pump piston design wherein there are rubber rings that provide these cylinder wall engaging lips and to provide an improved construction for expanding the lips into engagement with the cylinder walls.

More particularly, an object of the invention is to provide a mud pump piston wherein the cylinder wall engaging surfaces are formed of rubber rings of relatively stiff, wear-resistant rubber which rings can be easily molded and vulcanized and which form the expansible lips. Relatively soft rubber rings are associated with the stiff rubber rings and are so constructed that upon assembly of the piston, the soft rubber rings will be compressed and squeezed so as to expand the lips on the wear-resistant rings.

With the foregoing and other objects in view, which will be manifest in the following detailed description and specifically pointed out in the appended claims reference is had to the accompanying drawing for illustrative embodiments of the invention, wherein:

Figure 1 is a vertical section through one form of mud pump piston embodying my invention;

Fig. 2 is a view in side elevation, parts being broken away and shown in vertical section, illustrating an alternative mud pump piston design embodying my invention; and Fig. 3 is a view similar to Fig. 2 illustrating a further alternative form of construction of mud pump piston embodying my invention.

Referring to the accompanying drawing wherein similar reference characters designate similar parts throughout, and particularly to Fig. 1, the piston comprises a metal body illustrated as made up of three parts. Two parts each provide hub portions 10 and 11 designed to be slipped onto a piston rod of a mud pump. These portions may be made up from stock tubing. They have attached thereto end flanges 12 and 13 which may be made of steel plate and welded or otherwise attached to the hub portions. If desired the flange portions 12 and 13 may be made integral with the hub portions as by casting. Between the two end parts of the body there is disposed a central plate 14 which forms a central flange so that the completed body of the piston has projecting outwardly from its hub the central flange as well as the two end flanges. Rubber rings 15 and 16 fit between the central flange formed by plate 14 and the end flanges 12 and 13. These rubber rings are designed to engage the cylinder walls of the mud pump and are preferably formed of relatively stiff but pliable rubber of a quality that is quite wear resistant. With these outer rubber rings 15 and 16 there are disposed soft rubber rings 17 and 18 which are formed of relatively soft flexible elastic rubber stock. The soft rubber rings have hub portions 19 and 20 which fit around the hub portions of the piston body parts. They also have flange portions 21 and 22 which lie against the end flanges 12 and 13. These rubber rings 15 and 16 form annular lips 23 and 24 at the ends of the piston. The flanges 21 and 22 are preferably provided with annular grooves 25 and 26 which are open against the flanges 12 and 13. These flanges 21 and 22 are so formed that they project slightly beyond the ends of lips 23 and 24. That is, these flanges are in normal or unstressed condition somewhat thicker than shown on the drawing.

The purpose of so designing the flanges on the soft rubber rings is that when the piston is assembled and tightened together, the flanges 21 and 22 will be compressed or squashed, the effect being to press outwardly the lips 23 and 24 into good sealing and wiping engagement with the walls of the mud pump that at the same time the compression of these flanges forms a tight seal between the flange and the outer ends of the rings 15 and 16 preventing any leakage between the two rubber rings. The purpose of the grooves 25 and 26 is to allow any fluid tending to leak downwardly between the flanges 21 and 22 and flanges 12 and 13 to collect therein. This fluid which may collect in the grooves may assist in the action of the soft rubber flanges to expand the lips. As will be noted the flanges 12 and 13 extend outwardly beyond the flanges 21 and 22 so that they partially overlap the lips.

When the central plate 14 is disposed between the two hub portions 10 and 11 of the body as shown on Fig. 1, some provision should be made for holding this plate centered with respect to the body. To this end the central plate is formed with annular grooves 27 and 28 on its sides and annular lips 29 and 30 are formed on the inner faces of rings 15 and 16 to fit within these grooves. In this way the rings themselves have a connection with the plate to hold it centered.

The construction as illustrated in Fig. 2 is the same as that above described in Fig. 1, with the exception that the central plate indicated at 14a does not extend between the two hub portions 10a and 11a. Instead, these hub portions are recessed as indicated at 31 and the plate fits in the recesses formed on the hub portions. The plate thus being held and centered by the hub portions of the body, it is not necessary to form grooves on its face corresponding to grooves 27 and 28, nor to form beads 29 and 30 on the rubber rings. The action of the soft rubber rings and their flanges to expand the lips on the stiff rubber rings is the same as that above described in connection with Fig. 1.

In Fig. 3 the construction of the rings 15b and 16b and of the soft rubber rings 17b and 18b is the same as that illustrated in Fig. 2 and the action is substantially the same as that previously described.

In this form of construction the differences reside in the construction of a body which consists of three parts generally designated at 32, 33, and 34. Part 33 provides a hub portion and an integral end plate or end flange; part 32 provides a hub portion and an integral central flange; part 34 merely forms one end flange. In this form of construction, rings 16b and 18b can be slipped onto part 33 and rings 15b and 17b can be slipped onto part 32. Then the parts of the body may be conveniently assembled on the piston rod and part 34 will confine rings 15b and 17b in the space surrounding the hub portion of part 32.

In all of the forms as above described, it will be appreciated that there is provided a mud pump piston having a body providing a hub portion, a central flange, and end flanges with soft rubber rings providing soft rubber flanges lying against the inside faces of the end flanges and wear-resistant rubber rings fitting between the central flange and the end flanges having portions overlying and disposed in back of the soft rubber flanges, the overlying portions forming lips that are to be expanded by the squeezing or compression of the soft rubber flanges which normally project outwardly beyond the lips a short distance.

The parts of the piston can be easily constructed and the rubber rings are so formed as to be easily molded. Assembly of the piston is easily accomplished.

Various changes may be made in the details of construction without departing from the spirit or scope of the invention as defined by the appended claims.

I claim:

1. A mud pump piston having a body provided with hub and flange portions, a relatively soft rubber ring fitting around the hub portion and having a flange portion adapted to be engaged by the flange portion on the body, and a wear-resistant rubber ring encircling the soft rubber ring having a lip overlying the flange portion of the soft rubber ring.

2. A mud pump piston having a body provided with hub and flange portions, a relatively soft rubber ring fitting around the hub portion and having a flange portion adapted to be engaged by the flange portion on the body, a wear-resistant rubber ring encircling the soft rubber ring having a lip overlying the flange portion of the soft rubber ring, said flange portion on the soft rubber ring normally projecting beyond the end of the lip so that when it is longitudinally compressed by the flange on the body it will expand the lip into engagement with the cylinder walls.

3. A mud pump piston having a body provided with hub and flange portions, a relatively soft rubber ring surrounding the hub portion and having a flange portion adapted to be engaged by the flange portion on the body, a wear-resistant rubber ring encircling the soft rubber ring having a lip overlying the flange portion of the soft rubber ring, said flange portion on the soft rubber ring normally projecting beyond the end of the lip so that when it is longitudinally compressed by the flange on the body it will expand the lip into engagement with the cylinder walls, there being an annular groove on the face of the flange of the soft rubber ring.

4. A mud pump piston comprising means providing a body having a hub, end flanges and means providing a central flange, soft rubber rings fitting about the hub portion between the central flange and the end flanges, wear-resistant rings disposed about the soft rubber rings, said soft rubber rings being normally wider than the wear-resistant rings so that upon assembly and compression of the soft rubber rings, a portion at least of each wear-resistant ring will be expanded thereby.

5. A mud pump piston comprising means providing a body having a hub, end flanges and means providing a body having a hub, end flanges and means providing a central flange, soft rubber rings fitting about the hub portion between the central flange and the end flanges, each soft rubber ring having a flange portion lying against an end flange of the body, wear-resistant rings disposed about the soft rubber rings and fitting between the central flange and the end flanges, the soft rubber rings being wider than the wear-resistant rings so that upon assembly and compression of the soft rubber rings portions at least of the wear-resistant rings will be expanded thereby.

6. A mud pump piston comprising means providing a body having a hub, end flanges, and means providing a central flange, soft rubber rings fitting about the hub portion between the central flange and the end flanges, each soft rubber ring having a flange portion lying against an end flange of the body, wear-resistant rings disposed about the soft rubber rings and fitting between the central flange and the end flanges, the flange portions of the soft rubber rings being such as to normally project beyond the ends of the wear-resistant rings so that upon assembly and compression of the flanges portions at least of the wear-resistant rings will be expanded thereby.

7. A mud pump piston comprising means providing a body having a hub, end flanges, and means providing a central flange, soft rubber rings fitting about the hub portion between the central flange and the end flanges, each soft rubber ring having a flange portion lying against an end flange of the body, wear-resistant rings disposed about the soft rubber rings and fitting between the central flange and the end flanges, the flange portions of the soft rubber rings being such as to normally project beyond the ends of the wear-resistant rings so that upon assembly and compression of the flanges portions at least of the wear-resistant rings will be expanded thereby, there being annular grooves formed in the outer faces of the flanges on the soft rubber rings.

8. A mud pump piston comprising means providing a body having a hub portion, a central flange and end flanges, the central flange being adapted to substantially fit the cylinder walls of the pump in which the piston is designed to be used, wear-resistant rings fitting between the central flange and the end flanges, soft rubber rings encircling the hub portion between the central flange and the end flanges within the wear-resistant rings, said soft rubber rings having flanges positioned against said end flanges and normally projecting beyond the outer ends of the wear-resistant rings so that upon assembly and compression of the soft rubber flanges portions of the wear-resistant rings extending thereover will be expanded thereby.

9. A mud pump piston comprising means providing a body having a hub portion, a central flange and end flanges, the central flange being adapted to substantially fit the cylinder walls of the pump in which the piston is designed to be used, wear-resistant rings fitting between the central flange and the end flanges, soft rubber rings encircling the hub portion between the central flange and the end flanges within the wear-resistant rings, said soft rubber rings having flanges positioned against said end flanges and normally projecting beyond the outer ends of the wear-resistant rings so that upon assembly and compression of the soft rubber flanges portions of the wear-resistant rings extending thereover will be expanded thereby, there being grooves formed in the outer faces of the flanges on the soft rubber rings.

10. A mud pump piston comprising means providing a body having a hub portion, a central flange and end flanges, the central flange being adapted to substantially fit the cylinder walls of the pump in which the piston is designed to be used, wear-resistant rings fitting between the central flange and the end flanges, soft rubber rings encircling the hub portion between the central flange and the end flanges within the wear-resistant rings, said soft rubber rings having flanges positioned against said end flanges and normally projecting beyond the outer ends of the wear-resistant rings so that upon assembly and compression of the soft rubber flanges portions of the wear-resistant rings extending thereover will be expanded thereby, portions of the wear-resistant rings extending into grooves in the sides of the central flange adjacent the periphery thereof.

ERWIN E. MILLER.